United States Patent
Martin

(10) Patent No.: US 9,133,768 B2
(45) Date of Patent: Sep. 15, 2015

(54) LINER BRACKET FOR GAS TURBINE ENGINE

(75) Inventor: Keegan M. Martin, Stafford Springs, CT (US)

(73) Assignee: United Technologies Corporation, Hartford, CT (US)

(*) Notice: Subject to any disclaimer, the term of this patent is extended or adjusted under 35 U.S.C. 154(b) by 602 days.

(21) Appl. No.: 13/590,239

(22) Filed: Aug. 21, 2012

(65) Prior Publication Data

US 2014/0053564 A1 Feb. 27, 2014

(51) Int. Cl.
*F02C 7/20* (2006.01)
*F02K 1/82* (2006.01)

(52) U.S. Cl.
CPC . *F02C 7/20* (2013.01); *F02K 1/822* (2013.01); *F05D 2260/30* (2013.01); *Y02T 50/675* (2013.01)

(58) Field of Classification Search
CPC ............. F02K 9/84; F02K 1/004; F02K 1/80; F02K 1/822; F23R 3/60; F03C 7/20
USPC ............................ 60/796, 800, 230, 770, 766; 239/265.19, 265.35
See application file for complete search history.

(56) References Cited

U.S. PATENT DOCUMENTS

| | | | |
|---|---|---|---|
| 3,826,088 A | 7/1974 | Nash et al. | |
| 6,672,833 B2 | 1/2004 | MacLean et al. | |
| 7,770,399 B2 | 8/2010 | Burdick et al. | |
| 7,814,753 B2 | 10/2010 | Farah et al. | |
| 7,861,535 B2 | 1/2011 | Figueroa et al. | |
| 7,975,488 B2 | 7/2011 | Farah et al. | |
| 2009/0077978 A1* | 3/2009 | Figueroa et al. | 60/766 |
| 2009/0136342 A1 | 5/2009 | Westlake | |
| 2009/0230213 A1 | 9/2009 | Harris | |
| 2009/0293498 A1* | 12/2009 | Petty et al. | 60/796 |

* cited by examiner

*Primary Examiner* — Phuttiwat Wongwian
*Assistant Examiner* — Marc J Amar
(74) *Attorney, Agent, or Firm* — Carlson, Gaskey & Olds, PC

(57) ABSTRACT

A hanger for a gas turbine exhaust system includes an exhaust duct attachment structure associated with an exhaust duct and a liner attachment structure associated with a liner spaced radially inwardly of the exhaust duct. The exhaust duct attachment structure and the liner attachment structure cooperate to suspend the liner within the exhaust duct such that the exhaust duct and liner are movable relative to each other. At least one resilient member generates a resilient biasing force between the exhaust duct attachment structure and the liner attachment structure.

21 Claims, 2 Drawing Sheets

LINER BRACKET FOR GAS TURBINE ENGINE

BACKGROUND

In gas turbine engines it is necessary to protect exhaust ducts from damaging hot core gases by providing an insulating liner. The liner is suspended within the exhaust duct such that a gap is maintained between an inner surface of the exhaust duct and an outer surface of the liner. To alleviate some of the heat imparted to the liner by the hot gases, cooling air is passed through the gap between the exhaust duct and liner. Thus, the exhaust duct and liner are subjected to different pressure and temperature gradients, which results in differing expansion and contraction rates and amounts for each structure.

Additionally, certain aircraft requirements can exacerbate these differing expansion and contraction rates. For example, for certain aircraft types it can be desirable to have thrust vectoring capability or low radar signature profiles. As such, the exhaust duct and liner must be tailored to meet these requirements. This requires repositioning of the exhaust duct for thrust vectoring capability. Further, low radar signature profiles often require complex shapes that vary along the length of the duct and liner.

In order to maintain the desired temperature and pressure profile along the exhaust duct and liner, it is important to maintain proper spacing between the exhaust duct and liner. It is known to use a plurality of liner brackets or liner hangers to suspend the liner within the exhaust duct. However, attaching liners to non-circular, i.e. complex shape, ducts is difficult due to the varying tolerances between the exhaust duct and liner. Traditional attachment methods require a measurement and selection of an appropriate shim at each liner attachment location. This is costly and time consuming as there may be hundreds of liner attachment locations for each gas turbine engine.

SUMMARY

In a featured embodiment, a hanger for a gas turbine exhaust system has an exhaust duct attachment structure to be associated with an exhaust duct. A liner attachment structure is associated with a liner spaced radially inwardly of the exhaust duct. The exhaust duct and liner attachment structures cooperate to suspend the liner within the exhaust duct such that the exhaust duct and liner are movable relative to each other. At least one resilient member generates a resilient biasing force between the exhaust duct attachment structure and the liner attachment structure.

In another embodiment according to the previous embodiment, one of the exhaust duct attachment structure and liner attachment structure has a housing configured to be attached to a respective one of the exhaust duct or liner. The other of the exhaust duct attachment structure and liner attachment structure has a rod that is moveable relative to the housing.

In another embodiment according to any of the previous embodiments, the exhaust duct attachment structure has the housing and the liner attachment structure comprises the rod, and including a rotatable member seated within the housing, and wherein the rod has a first end associated with the rotatable member and a second end that is configured to be attached to the liner.

In another embodiment according to any of the previous embodiments, the resilient member reacts between the first end of the rod and the rotatable member.

In another embodiment according to any of the previous embodiments, the rotatable member has a spherical bearing.

In another embodiment according to any of the previous embodiments, the spherical bearing includes a center recess that receives the first end of the rod in a sliding relationship.

In another embodiment according to any of the previous embodiments, the center recess is defined by an enlarged recess portion and a reduced recess portion. The rod has a rod body with a flange at the first end. The flange is received within the enlarged recess portion with the rod body extending through the reduced recess portion to connect to the liner.

In another embodiment according to any of the previous embodiments, the resilient member reacts between the flange and a bottom surface of the enlarged recess portion to generate a biasing force that forces the rod in a radially outward direction relative to the spherical bearing.

In another embodiment according to any of the previous embodiments, the resilient member has a spring.

In another embodiment according to any of the previous embodiments, the resilient member has a spring that is configured to bias the exhaust duct attachment structure and the liner attachment structure towards each other.

In another embodiment according to any of the previous embodiments, a rotatable member connects the exhaust duct attachment structure to the liner attachment structure. The at least one resilient member reacts between the rotatable member and one of the liner attachment structure and exhaust duct attachment structure.

In another featured embodiment, a gas turbine engine has an exhaust duct, and a liner assembly spaced radially inwardly of the exhaust duct. At least one hanger suspends the liner assembly within the exhaust duct such that the liner assembly is movable relative to the exhaust duct. The at least one hanger includes a housing attached to one of the liner assembly and the exhaust duct. A rotatable member is mounted within the housing. A rod coupled to the rotatable member and the other of the liner assembly and the exhaust duct, and at least one resilient member that reacts between the rotatable member and the rod.

In another embodiment according to the previous embodiment, the resilient member has at least one spring that biases the rod and rotatable member towards each other.

In another embodiment according to any of the previous embodiments, the rotatable member has a spherical bearing.

In another embodiment according to any of the previous embodiments, the rod has a rod body extending from a first rod end to a second rod end, with the first rod end having an enlarged flange that is received within a recess formed within the rotatable member.

In another embodiment according to any of the previous embodiments, the resilient member reacts between the flange and the rotatable member.

In another embodiment according to any of the previous embodiments, the rotatable member has a spherical outer surface portion that is received within a socket formed within the housing. The rod has a first end coupled to the rotatable member and a second end configured for attachment to the liner assembly or exhaust duct. The resilient member is received within a recess formed within the spherical bearing.

In another featured embodiment, a method of suspending a liner within an exhaust duct for a gas turbine engine, such that the liner and exhaust duct are moveable relative to each other, includes the steps of (a) connecting a liner attachment structure to the liner; (b) connecting an exhaust duct attachment structure to the exhaust duct; and (c) generating a resilient biasing force between the liner attachment structure and the exhaust duct attachment structure when the liner attachment structure and exhaust duct attachment structure are coupled to each other.

In another embodiment according to the previous embodiment, the liner attachment structure comprises a rod and the exhaust duct structure comprises a housing, and includes the steps of installing a rotatable member within the housing and coupling the rod to the rotatable member.

In another embodiment according to any of the previous embodiments, at least one resilient member is provided to react between the rod and the rotatable member.

BRIEF DESCRIPTION OF THE DRAWINGS

The disclosure can be further understood by reference to the following detailed description when considered in connection with the accompanying drawings wherein.

DETAILED DESCRIPTION

Figure 1:
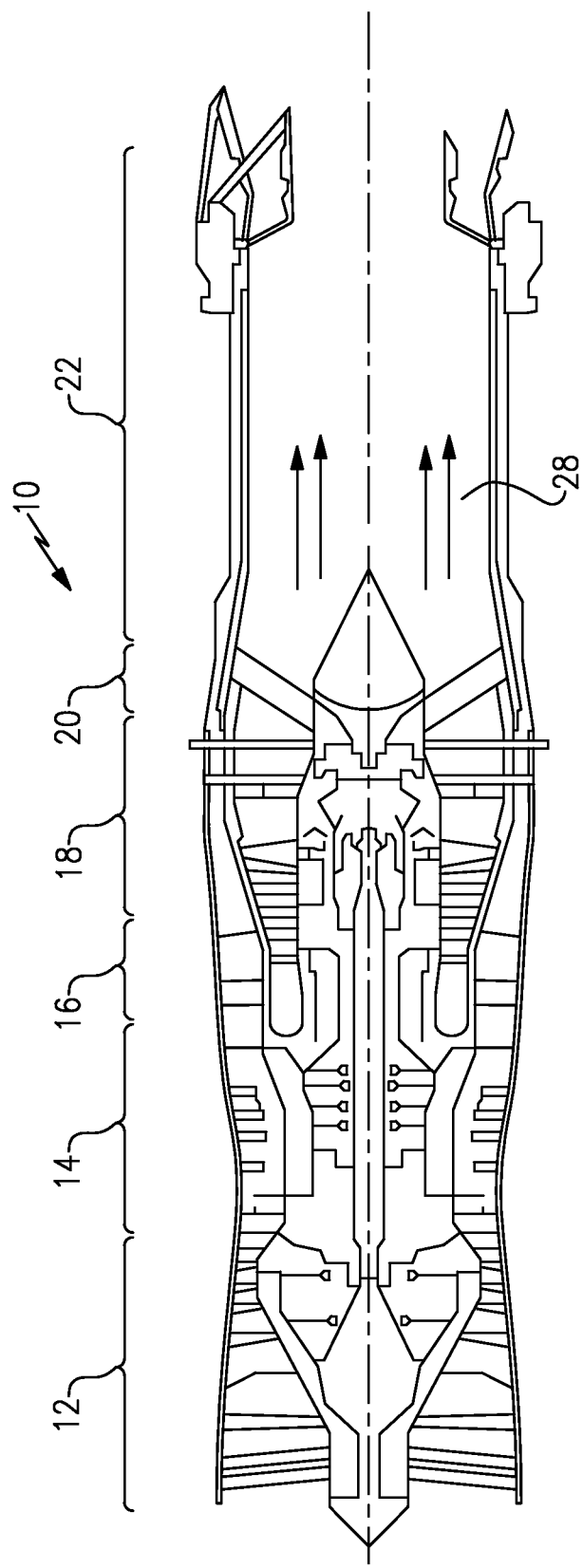
FIG. 1 schematically illustrates a gas turbine engine embodiment.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with fuel and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

Figure 2:
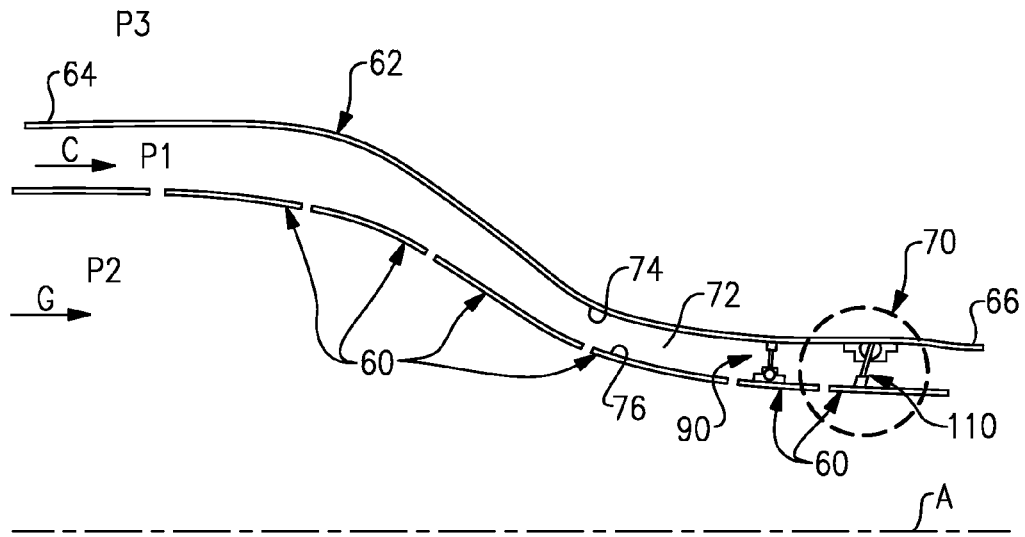
FIG. 2 is a schematic side view of an engine upper half showing a liner attached to an exhaust duct with a liner bracket.
Figure 3:
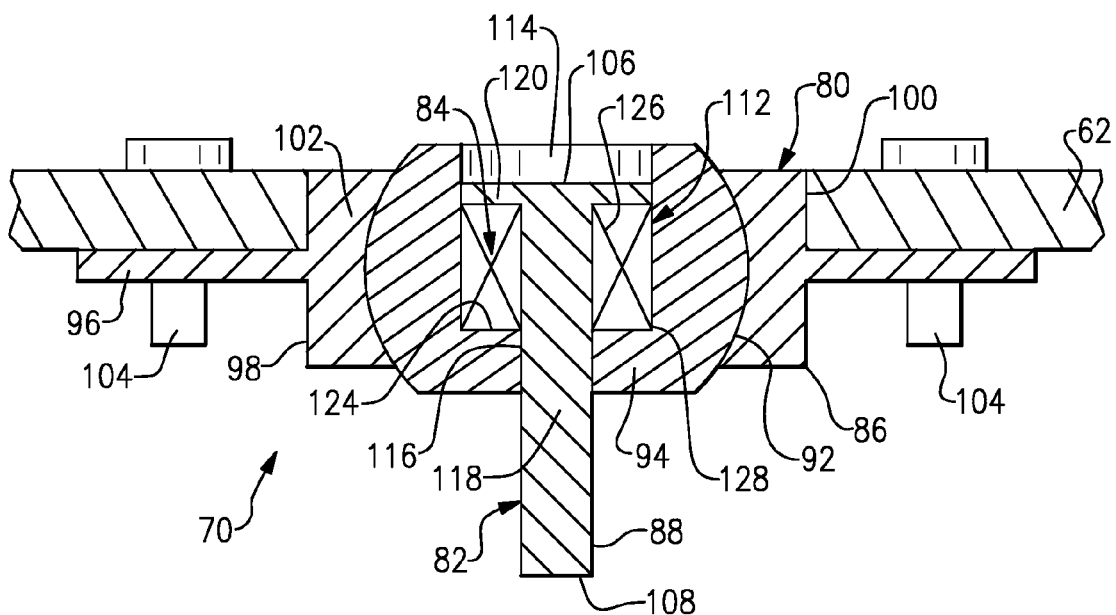
FIG. 3 shows a cross-sectional view of the liner bracket of FIG. 2.

Referring to FIGS. 2 and 3, the liner assembly 22, comprised of one or more liners 60, is suspended radially inward of an exhaust duct 62. The exhaust duct 62 has an upstream end 64 and a downstream end 66. The upstream end 64 of the exhaust duct 62 is typically supported at the downstream end of the gas turbine engine 10. As such, exhaust gas from the gas turbine engine 10 travels through the exhaust duct 62 and exits at the downstream end 66. The exhaust duct 62 primarily acts to expel the discharged gases of the gas turbine engine from the fuselage of the aircraft in which the gas turbine engine 10 is used. For example, exhaust duct 62 prevents the hot gases from entering the fuselage and damaging internal aircraft components. However, the exhaust duct 62 must also comply with other demands of the gas turbine engine or the aircraft. For example, the exhaust duct 62 may need to 1) fit within the confines of small unmanned aircraft, 2) comply with the geometries of low radar signature aircraft, or 3) perform thrust vectoring functions. As such, the shape of the exhaust duct 62 can take on a complex shape as the duct body extends in the axial direction along central axis A.

Additionally, upstream end 64 is positioned adjacent the core of the gas turbine engine 10 and is therefore subjected to extremely high temperatures from the exhaust gas. The exhaust gas cools somewhat as it reaches downstream end 66, but still remains at a relatively high temperature level. The exhaust duct 62 is typically comprised of titanium-based alloys due to their high strength and low weight. The exhaust duct 62 is lined with the exhaust duct liner 60 in order to shield the exhaust duct 62 from the exhaust gas.

Exhaust gas G enters the exhaust duct liner 60 from the gas turbine engine 10 at elevated temperatures and, as such, a temperature gradient is produced from upstream end 64 to downstream end 66. Additionally, since duct liner 60 shields exhaust duct 62 from exhaust gas G, a temperature differential is produced between duct liner 60 and exhaust duct 62. Thus, exhaust duct 62 and duct liner 60 are subjected to differing temperature profiles during operation of the gas turbine engine, which fluctuates as the gas turbine engine cycles up and cycles down while performing different maneuvers. Compounded by the difference in thermal expansion properties of exhaust duct 62 and duct liner 60, exhaust duct 62 and duct liner 60 undergo significantly different thermal deformations in use. Because of their complex shapes and differing materials, exhaust duct 62 and duct liner 60 do not, however, undergo the same deformation, which has a tendency to alter the spacing between exhaust duct 62 and duct liner 60. It is necessary, however, to maintain the spacing between exhaust duct 62 and duct liner 60 in order to maintain proper cooling of the exhaust system.

A plurality of liner hangers 70 are used to suspend the duct liner 60 within the exhaust duct 62. This maintains a gap 72 between an inner surface 74 of the exhaust duct 62 and an outer surface 76 of the liner 60. Cooling air C from the gas turbine engine fan 12 (FIG. 1), for example, is routed into this gap 72 between the exhaust duct 62 and duct liner 60 to reduce the thermal effects of exhaust gas G. Exhaust gas G and cooling air C produce a pressure differential between the interior of exhaust duct 62 and the interior of exhaust duct liner 60. For example, pressure P1 of cooling air C is typically greater than both pressure P2 of exhaust gas G and pressure P3 of the ambient air. As such, duct liner 60 and exhaust duct 62 are subject to various forces.

Exhaust duct 62 is typically rigid and fixed in place as it extends through the fuselage of an aircraft and is thus mechanically restrained, while duct liner 60 is suspended within exhaust duct 62 by the hangers 70. Accordingly, exhaust duct 62 and duct liner 60 are subjected to different mechanical and thermal loads when used in conjunction with a gas turbine engine 10. The hangers 70 are thus subjected to significant stresses as duct liner 60 shifts within exhaust duct 62. The hangers 70 are configured to permit multi-axis shifting of the duct liner 60 in order to alleviate stress generated within hangers 70.

An example of a hanger 70 is shown in FIG. 3. The hanger 70 includes an exhaust duct attachment structure 80 to be associated with the exhaust duct 62 and a liner attachment structure 82 to be associated with the liner 60 spaced radially inwardly of the exhaust duct 62. The exhaust duct 80 and liner 82 attachment structures cooperate to suspend the liner 60 within the exhaust duct 62 such that the exhaust duct 62 and liner 60 are movable relative to each other. At least one resilient member 84 generates a resilient biasing force between the exhaust duct attachment structure 80 and the liner attachment structure 82.

In the example shown in FIG. 3, the exhaust duct attachment structure 80 comprises a housing 86 that is configured to be attached to the exhaust duct 62, and the liner attachment structure 82 comprises a rod 88 that is moveable relative to the housing 86, and which is configured to be attached to the liner 60. The reverse configuration could also be used where the housing 86 is attached to the liner 60 and the rod 88 is attached to the exhaust duct 62 as schematically indicated at 90 in FIG. 2.

As shown in FIG. 3, the housing 86 includes a central bore that defines a socket 92 to receive a rotatable member 94. The housing 86 includes a mount structure 96, such as a flange for example, that is formed at least partially about an outer periphery 98 of the housing 86. In one example, the exhaust duct 62 can include an opening 100 that receives a main body portion 102 of the housing 86. The mount structure 96 abuts against the exhaust duct 62 about a periphery of the opening 100 and a plurality of fasteners 104 extend through the duct 62 and mount structure 96 to fix the housing 86 to the exhaust duct 62. While fasteners are shown as an example method of attachment, it should be understood that other methods of attachment could also be used.

The 88 rod has a first end 106 associated with the rotatable member 94 and a second end 108 that is configured to be attached to the liner 60 at a liner attachment interface schematically indicated at 110 in FIG. 2. Any type of attachment method or structure can be used for liner attachment interface 110. Further, the attachment interface 110 can comprise a fixed or pivotable attachment interface.

In the example shown, the resilient member 84 reacts between the first end 106 of the rod 88 and the rotatable member 94. In one example, the rotatable member 94 comprises a spherical bearing that is seated within the socket 92 to allow for multi-axis shifting of the liner 60 within the duct 62. In this example, the rotatable member 94 includes a center recess 112 that receives the first end 106 of the rod 88 in a sliding relationship. The center recess 112 is defined by an enlarged recess portion 114 and a reduced recess portion 116.

The rod 88 comprises a rod body 118 defined by a first diameter and having a flange 120 at the first end 106. The flange 120 is defined by a second diameter, greater than the first diameter, and is received within the enlarged recess portion 114. The rod body 118 extends through the reduced recess portion 116 to connect to the liner 60 at the second rod end 108. The reduced recess portion 116 defines an axial path for sliding movement of the rod 88 relative to the rotatable member 94. The axial path is generally transversely orientated relative to the central axis A and moves through multiple different orientations relative to the central axis A as the rotatable member 94 moves within the socket 92.

In one example, the resilient member 84 reacts between the flange 120 and a bottom surface 124 of the enlarged recess portion 114 to generate a biasing force that forces the rod 88 in a radially outward direction relative to the rotatable member 94. Thus, the resilient member 84 is configured to bias the duct 62 and liner 60 towards each other. In one example, the resilient member 84 comprises a spring having a first spring end 126 abutting against the flange 120 and a second spring end 128 abutting against the bottom surface 124.

A method of suspending the liner 60 within the exhaust duct 62 such that the liner 60 can move relative to the duct 62 includes the steps of connecting the liner attachment structure 82 to the liner 60, connecting the exhaust duct attachment structure 80 to the exhaust duct 62, and generating a resilient biasing force between the liner attachment structure 82 and the exhaust duct attachment structure 80 when the liner attachment structure 82 and exhaust duct attachment structure 80 are coupled to each other. In one example, the liner attachment structure 82 comprises the rod 88 and the exhaust duct attachment structure 80 comprises the housing 86, and the method includes installing a rotatable member 94 within the housing 86 and coupling the rod 88 to the rotatable member 94. The resilient member 84 is installed to react between the rod 88 and the rotatable member 94 to bias the duct 62 and liner 60 towards each other.

By using the resiliently biased hangers 70, liners 60 can be quickly and efficiently installed within the duct 62. Further, the time consuming shimming process is no longer needed as the resiliency of the hangers 70 automatically adjusts for tolerance differences between the complex shaped duct 62 and liner 60.

Although an example embodiment has been disclosed, a worker of ordinary skill in this art would recognize that certain modifications would come within the scope of the claims. For that reason, the following claims should be studied to determine their true scope and content.

What is claimed is:

1. A hanger for a gas turbine exhaust system comprising:
    an exhaust duct attachment structure to be associated with an exhaust duct;
    a liner attachment structure to be associated with a liner spaced radially inwardly of the exhaust duct, wherein the exhaust duct and liner attachment structures cooperate to suspend the liner within the exhaust duct such that the exhaust duct and liner are movable relative to each other;
    wherein at least one of the exhaust duct attachment structure and liner attachment structure includes a rotatable member and a rod that is moveable relative to the rotatable member; and
    at least one resilient member cooperating with the rotatable member and rod to generate a resilient biasing force between the exhaust duct attachment structure and the liner attachment structure.

2. The hanger according to claim 1 wherein one of the exhaust duct attachment structure and liner attachment structure comprises a housing configured to be attached to a respective one of the exhaust duct or liner, the housing receiving the rotatable member, and wherein the resilient member reacts between the rod and the rotatable member such that the rod is slideable within the rotatable member and is moveable relative to the housing.

3. The hanger according to claim 2 wherein the housing is attached to the exhaust duct, and wherein the rod has a first end associated with the rotatable member and a second end that is configured to be attached to the liner.

4. The hanger according to claim 3 wherein the resilient member reacts between the first end of the rod and the rotatable member.

5. The hanger according to claim 3 wherein the rotatable member comprises a spherical bearing.

6. The hanger according to claim 5 wherein the spherical bearing includes a center recess that receives the first end of the rod in a sliding relationship.

7. The hanger according to claim 6 wherein the center recess is defined by an enlarged recess portion and a reduced recess portion, and wherein the rod comprises a rod body having a flange at the first end, and wherein the flange is received within the enlarged recess portion with the rod body extending through the reduced recess portion to connect to the liner.

8. The hanger according to claim 1 wherein the resilient member comprises a spring that is configured to bias the exhaust duct attachment structure and the liner attachment structure towards each other.

9. The hanger according to claim 1 wherein the at least one resilient member reacts between the rotatable member and one of the liner attachment structure and exhaust duct attachment structure.

10. The hanger according to claim 1 wherein the rod is slideable relative to the rotatable member.

11. The hanger according to claim 10 including a housing attached to one of the exhaust duct and liner, the housing receiving the rotatable member, wherein the rod has a first end received within a recess formed in the rotatable member and a second end coupled to the other of the exhaust duct and liner, and wherein the first end slides back and forth within the recess.

12. A hanger for a gas turbine exhaust system comprising:
an exhaust duct attachment structure to be associated with an exhaust duct;
a liner attachment structure to be associated with a liner spaced radially inwardly of the exhaust duct, wherein the exhaust duct and liner attachment structures cooperate to suspend the liner within the exhaust duct such that the exhaust duct and liner are movable relative to each other, and wherein the exhaust duct attachment structure comprises a housing configured to be attached to the exhaust duct, and wherein the liner attachment structure comprises a rod that is moveable relative to the housing;
a rotatable member comprising a spherical bearing seated within the housing, and wherein the rod has a first end associated with the rotatable member and a second end that is configured to be attached to the liner, and wherein the spherical bearing includes a center recess that receives the first end of the rod in a sliding relationship, and wherein the center recess is defined by an enlarged recess portion and a reduced recess portion, and wherein the rod comprises a rod body having a flange at the first end, and wherein the flange is received within the enlarged recess portion with the rod body extending through the reduced recess portion to connect to the liner; and
at least one resilient member generating a resilient biasing force between the exhaust duct attachment structure and the liner attachment structure, wherein the resilient member reacts between the flange and a bottom surface of the enlarged recess portion to generate a biasing force that forces the rod in a radially outward direction relative to the spherical bearing.

13. The hanger according to claim 12 wherein the resilient member comprises a spring.

14. A gas turbine engine comprising:
an exhaust duct;
a liner assembly spaced radially inwardly of the exhaust duct; and
at least one hanger that suspends the liner assembly within the exhaust duct such that the liner assembly is movable relative to the exhaust duct, the at least one hanger including a housing attached to one of the liner assembly and the exhaust duct, a rotatable member mounted within the housing, a rod coupled to the rotatable member and the other of the liner assembly and the exhaust duct such that the rod is movable relative to the rotatable member, and at least one resilient member that reacts between the rotatable member and the rod.

15. The gas turbine engine according to claim 14 wherein the resilient member comprises at least one spring that biases the rod and rotatable member towards each other.

16. The gas turbine engine according to claim 14 wherein the rotatable member comprises a spherical bearing.

17. The gas turbine engine according to claim 14 wherein the rod comprises a rod body extending from a first rod end to a second rod end, the first rod end having an enlarged flange that is received within a recess formed within the rotatable member such that the enlarged flange is slidable within the recess.

18. The gas turbine engine according to claim 17 wherein the resilient member reacts between the enlarged flange and the rotatable member.

19. The gas turbine engine according to claim 14 wherein the rotatable member has a spherical outer surface portion that is received within a socket formed within the housing, and wherein the rod has a first end coupled to the rotatable member for sliding movement relative thereto and a second end configured for attachment to the liner assembly or exhaust duct, the resilient member being received within a recess formed within the rotatable member.

20. The gas turbine engine according to claim 14 wherein the rod is slideable relative to the rotatable member.

21. The gas turbine engine according to claim 20 wherein the rod has a first end received within a recess formed in the rotatable member and a second end coupled to one of the liner assembly and exhaust duct, and wherein the first end slides back and forth within the recess.

* * * * *